United States Patent
Hang et al.

(10) Patent No.: US 9,537,838 B2
(45) Date of Patent: Jan. 3, 2017

(54) ADJUSTABLE PROXY RE-ENCRYPTION

(71) Applicants: Isabelle Hang, Darmstadt (DE);
Florian Kerschbaum, Karlsruhe (DE);
Mathias Kohler, Stutensee (DE);
Martin Haerterich, Wiesloch (DE);
Florian Hahn, Karlsruhe (DE); Axel Schroepfer, Rheinstetten (DE); Walter Tighzert, Heidelberg (DE); Andreas Schaad, Bruchsal (DE)

(72) Inventors: Isabelle Hang, Darmstadt (DE);
Florian Kerschbaum, Karlsruhe (DE);
Mathias Kohler, Stutensee (DE);
Martin Haerterich, Wiesloch (DE);
Florian Hahn, Karlsruhe (DE); Axel Schroepfer, Rheinstetten (DE); Walter Tighzert, Heidelberg (DE); Andreas Schaad, Bruchsal (DE)

(73) Assignee: SAP SE, Walldorf (DE)

( * ) Notice: Subject to any disclaimer, the term of this patent is extended or adjusted under 35 U.S.C. 154(b) by 64 days.

(21) Appl. No.: 14/579,317

(22) Filed: Dec. 22, 2014

(65) Prior Publication Data
US 2016/0182467 A1 Jun. 23, 2016

(51) Int. Cl.
*H04L 29/06* (2006.01)

(52) U.S. Cl.
CPC ....... *H04L 63/0464* (2013.01); *H04L 63/0471* (2013.01); *H04L 63/0807* (2013.01)

(58) Field of Classification Search
CPC ............ H04L 63/0471; H04L 63/0464; H04L 63/0807; H04L 9/08; G06F 21/30
See application file for complete search history.

(56) References Cited

U.S. PATENT DOCUMENTS

| | | | |
|---|---|---|---|
| 5,572,673 | A | 11/1996 | Shurts |
| 6,038,563 | A | 3/2000 | Bapat et al. |
| 6,487,552 | B1 | 11/2002 | Lei et al. |
| 7,743,069 | B2 | 6/2010 | Chitkara et al. |
| 7,844,829 | B2 | 11/2010 | Meenakshisundaram |
| 7,995,750 | B2 | 8/2011 | Kerschbaum et al. |

(Continued)

OTHER PUBLICATIONS

Mihir Bellare, "Deterministic and efficiently searchable encryption", 2007 , pp. 535-552.*

*Primary Examiner* — Jayesh Jhaveri
*Assistant Examiner* — Wasika Nipa
(74) *Attorney, Agent, or Firm* — Fish & Richardson P.C.

(57) ABSTRACT

Methods, systems, and computer-readable storage media for proxy re-encryption of encrypted data stored in a first database of a first server and a second database of a second server. Implementations include actions of receiving a first token at the first server from a client-side computing device, providing a first intermediate re-encrypted value based on a first encrypted value and the first token, transmitting the first intermediate re-encrypted value to the second server, receiving a second intermediate re-encrypted value from the second server, the second intermediate re-encrypted value having been provided by encrypting the first encrypted value at the second server based on a second token, providing the first encrypted value as a first re-encrypted value based on the first intermediate re-encrypted value and the second intermediate re-encrypted value, and storing the first re-encrypted value in the first database.

17 Claims, 4 Drawing Sheets

(56) References Cited

U.S. PATENT DOCUMENTS

| | | | |
|---|---|---|---|
| 8,873,754 B2* | 10/2014 | Xu | H04L 9/0861 380/255 |
| 2003/0046572 A1 | 3/2003 | Newman et al. | |
| 2004/0139043 A1 | 7/2004 | Lei et al. | |
| 2004/0243816 A1 | 12/2004 | Hacigumus et al. | |
| 2008/0033960 A1 | 2/2008 | Banks et al. | |
| 2012/0330925 A1 | 12/2012 | Ramamurthy et al. | |
| 2013/0191650 A1 | 7/2013 | Balakrishnan et al. | |
| 2013/0246813 A1 | 9/2013 | Mori et al. | |
| 2013/0262863 A1 | 10/2013 | Yoshino et al. | |
| 2014/0006773 A1* | 1/2014 | Chazalet | H04L 63/0428 713/150 |
| 2014/0101438 A1 | 4/2014 | Elovici et al. | |

* cited by examiner

ADJUSTABLE PROXY RE-ENCRYPTION

BACKGROUND

Encrypted databases provide data protection (security) in cloud platforms and/or database-as-a-service settings. In encrypted databases, data (plaintext) can be encrypted at the client to provide encrypted data (ciphertext), which can be provided to the database for storage. In some examples, a third-party provides and maintains the database. That is, the database is outsourced to the third-party. For example, a client encrypts data using one or more encryption keys to provide encrypted data, which the client sends to the third-party for storage in the database.

Outsourcing a database offers efficient resource management and low maintenance costs for clients, but exposes outsourced data (client data) to a service provider (the third-party providing the database and its agents). One issue is periodically re-encrypting the database (e.g., changing the encryption key(s)), because it may be difficult to determine whether an encryption key has been compromised and data is at risk. In one traditional approach, the entire database is downloaded, is rekeyed using a different encryption key, and is uploaded back to the database. This download, rekey, and upload implies huge communication costs and often a significant downtime.

SUMMARY

Implementations of the present disclosure include computer-implemented methods for proxy re-encryption of encrypted data stored in a first database of a first server and a second database of a second server. In some implementations, actions include receiving a first token at the first server from a client-side computing device, providing a first intermediate re-encrypted value based on a first encrypted value and the first token, transmitting the first intermediate re-encrypted value to the second server, receiving a second intermediate re-encrypted value from the second server, the second intermediate re-encrypted value having been provided by encrypting the first encrypted value at the second server based on a second token, providing the first encrypted value as a first re-encrypted value based on the first intermediate re-encrypted value and the second intermediate re-encrypted value, and storing the first re-encrypted value in the first database. Other implementations of this aspect include corresponding systems, apparatus, and computer programs, configured to perform the actions of the methods, encoded on computer storage devices.

These and other implementations can each optionally include one or more of the following features: the first encrypted value and the first re-encrypted value are encrypted using deterministic encryption; actions further include: providing a third intermediate re-encrypted value and a fourth intermediate re-encrypted value based on a second encrypted value and the first token, transmitting the third intermediate re-encrypted value and the fourth intermediate re-encrypted value to the second server, receiving a fifth intermediate re-encrypted value and a sixth intermediate re-encrypted value from the second server, the fifth intermediate re-encrypted value and the sixth intermediate re-encrypted value having been provided at the second server based on a second token, providing the second encrypted value as a second re-encrypted value based on the third intermediate re-encrypted value, the fourth intermediate re-encrypted value, the fifth intermediate re-encrypted value and the sixth intermediate re-encrypted value, and storing the second re-encrypted value in the first database; the second encrypted value and the second re-encrypted value are encrypted using randomized encryption; the first database and the second database store the same encrypted data; the first token and the second token are each provided by the client-side computing device based on an encryption key that the encrypted value was encrypted with, and a new encryption key; and the first re-encrypted value is also provided by the second server and is stored in the second database.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to proxy re-encryption of encrypted data stored in a database. More specifically, implementations of the present disclosure provide a joint protocol for proxy re-encryption of encrypted data stored in a first database and a second database.

Figure 1:
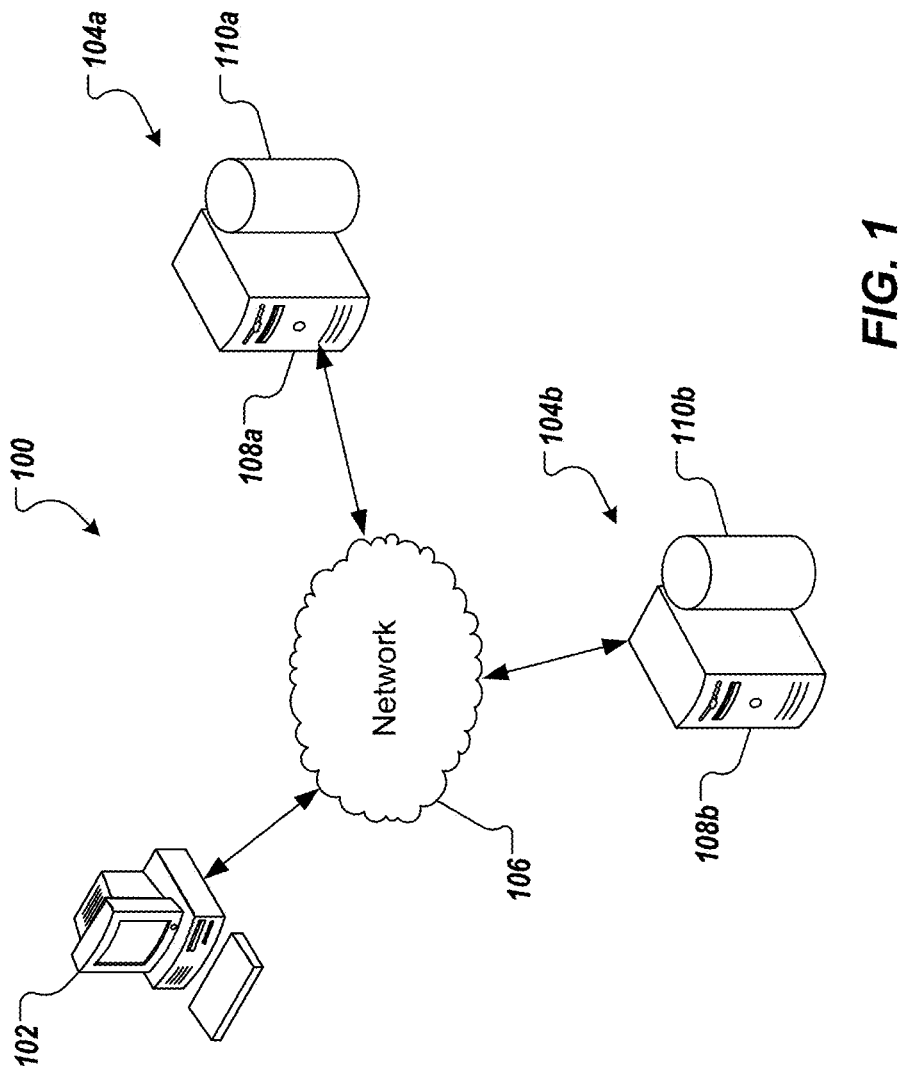
FIG. 1 depicts an example high-level architecture in accordance with implementations of the present disclosure.

FIG. 1 depicts an example high-level architecture 100 in accordance with implementations of the present disclosure. The high-level architecture 100 includes a computing device 102, e.g., client-side, server systems 104*a*, 104*b* and a network 106. In some examples, the computing device 102 and the server systems 104a, 104b communicate over the network 106. In some examples, the computing device 102 can communicate with the server systems 104a, 104b over one or more networks, e.g. the network 106. In some examples, the computing device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices.

In some implementations, the server systems 104a, 104b include at least one server device 108a, 108b and at least one data store 110a, 110b. In the example of FIG. 1, the server systems 104a, 104b are each intended to represent various forms of servers including, but not limited to a web server, an application server, a proxy server, a network server, and/or a server pool. In general, server systems accept requests for application services and provides such services to any number of client devices, e.g., the computing device 102, over the network 106.

In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In accordance with implementations of the present disclosure, the server systems 104a, 104b can each maintain a database that stores encrypted data, e.g., an encrypted database. In some examples, the data (plaintext) is encrypted at the computing device 102, and the encrypted data (ciphertext) is sent to the server systems 104a, 104b over the network 106 for storage. In some implementations, and as described herein, the server systems 104a, 104b can be provided by respective third-party service providers, which store and provide access to the encrypted data.

In some implementations, a database is part of a database system that also includes a query execution engine. In some examples, the query execution engine receives a query (e.g., a search token from a client), provides a query plan based on the query, executes the query plan to provide a response (e.g., encrypted data from the database that is responsive to the query), and transmits the response to the client (e.g., from which the query was received).

As introduced above, one issue with outsourced databases is periodically re-encrypting the data stored in the database (e.g., changing the encryption key). For example, it may be difficult to determine whether a key has been compromised and data is at risk. Consequently, the data is periodically re-encrypted. Traditional approaches to re-encryption can results in significant communication costs and downtime (e.g., bandwidth and time required to download, rekey, and upload).

In view of this, implementations of the present disclosure provide a proxy re-encryption (PRE) scheme for re-encrypting encrypted data stored in an outsourced database (e.g., cloud database). In accordance with the present disclosure, the PRE scheme is unidirectional, multi-use and adjustable. With regard to unidirectional, if a current encryption key is compromised and the server (third-party server) can revert to the earlier encryption key, the server can decrypt all new ciphertexts. This breaks the basic security guarantee of encrypted cloud databases. Consequently, implementations of the present disclosure are uni-directional, in that the encryption key of encrypted data cannot be reverted to an earlier encryption key. With regard to multi-use, rekeying can occur regularly (e.g., at predefined intervals) and may even occur exceptionally (e.g., in response to a known compromise). An intermediate, one-time re-encryption does not solve the problem for long running databases. With regard to adjustable, adjustable encryption (also referred to as onion encryption) enables security in the database, while enabling the execution of previously unknown queries. More specifically, adjustable encryption enables data stored in the database to be encrypted with different encryption schemes, which are only removed if required to execute a query. In some examples, in case a column is used in a query as a search condition, the column can be adjusted from, for example, a first encryption that is indistinguishability under chosen plaintext attack (IND-CPA) secure to a second encryption that is less secure, but enables execution of the search condition. In view of this, and as described in further detail herein, the PRE scheme of the present disclosure is able to rekey multiple encryption schemes.

In accordance with implementations of the present disclosure, multiple third-party service providers (also referred to as cloud providers) are used to source the encrytped database. For example, two third-party service providers (TSPs) can be used. With reference to FIG. 1, a first TSP can operate the server system 104a and maintain a first databse thereon, and a second TSP can operate the server system 104b and maintain a second database thereon. In some implementations, a client can encrypt data to provide encrypted data and can store the encrypted data in both the first database and the second database. In some examples, search queries (e.g., encrypted search tokens) can be submitted to any of the multiple third-parts service providers, which introduces additional fail-over dependability. For example, and with reference to FIG. 1, a client can submit queries to the server system 104a and/or the server system 104b from the computing device 102, because both the first database and the second database store the encrypted data provided by the client.

In accordance with implementations of the present disclosure, and as described in further detail herein, re-encryption (re-keying) operations are executed by both of the third-party service providers in a joint protocol (e.g., the first TSP and the second TSP of FIG. 1). The PRE scheme of the present disclosure is adjustable. In some examples, multiple types of encryption schemes are supported (e.g., deterministic (DET) encryption, randomized (RND) encryption). Consequently, adjustable (onion) encrypted databases can be re-encrypted using the PRE scheme of the present disclosure, which significantly increases the security compared to only DET encrypted databases, for example, or the flexibility compared to systems that require all queries to be pre-specified. In some implementations, the PRE scheme enables databases, stored at multiple, independent cloud providers to be rekeyed with constant communication cost at the client. Further, because most of the communication is between the cloud providers, implementations of the present disclosure significantly decrease downtime, relative to traditional approaches.

Implementations of the present disclosure can further provide cryptographic enforcement of access control (e.g., controlling which users are the client are able to access which data based on one or more access control policies (ACPs)). For example a file collection or database, which uses adjustable encryption for searches and different keys to enforce different access rights can be considered. An access policy granting or revoking operations in this database requires changing the key of the affected data (e.g., a user is granted access to data, a user's access to data is revoked). Implementations of the present disclosure can effect this change without downloading the data from the encrypted database.

Implementations of the present disclosure will be described in further detail with reference to an example threat model. In accordance with the example threat model, a data owner outsources its data in the cloud. The data owner, however, wants to maintain confidentiality of the data against honest-but-curious cloud providers (e.g., the cloud providers are passive, such that a cloud provider can read all information stored on the outsourced database, but do not manipulate the stored data or issued search queries). The cloud providers are independent. That is, the cloud providers do not collude. To protect the confidentiality of data in the face of honest-but-curious cloud providers, the data (plaintext) is encrypted to provide encrypted data (ciphertext), which will be outsourced in the cloud.

In view of the example threat model, implementations of the present disclosure supports encrypted query processing by applying adjustable encryption. As an example, a data column encrypted with DET encryption and with randomized RND encryption, in respective onion layers, is outsourced in the cloud. This prevents honest-but-curious cloud providers from accessing data. In some examples, the RND encryption ensures that the encrypted data is IND-CPA secure. However, RND encryption only supports the execution of a limited set of query operations (e.g., SQL operations), which include, for example, projection, set union, and count. Consequently, it might be necessary to adjust the encryption from RND encryption to DET encryption to support other query operations. In some examples, DET encryption is less secure than RND encryption. For example, DET encryption only ensures that the encrypted data is indistinguishability under a known plaintext attack (IND-KPA) secure. DET encryption, however, efficiently supports a wider range of query operations, such as, for example, selection, group by, count distinct, equi-join, and set difference. That is, for example, a search equality query of plaintexts is performed as a search equality query of ciphertexts. The encryption adjustment is executed by the cloud provider and is triggered by a query of the data owner. For this, the data owner sends an adjustment key to the cloud provider. Adjustable encryption leaks less information to the cloud provider than encrypting all data deterministically, because the RND encryption is only adjusted to DET encryption, if necessary to process a query.

In view of this context, and as introduced above, implementations of the present disclosure provide a joint protocol for rekeying (re-encrypting) encrypted data. To illustrate implementations, the example data column described above (encrypted and outsourced in the cloud) can be considered, for which the data owner wants to rekey (re-encrypt) the data column. In accordance with the present disclosure, re-encryption is executed by two non-colluding cloud providers.

In some implementations, if the data column is encrypted with RND encryption, the re-encryption revokes the current RND encryption key (the old encryption key) and establishes a new encryption key, while preserving the RND encryption. In addition, the re-encryption also adapts the key of the deterministic encryption. In this manner, a current DET encryption key is replaced with a new DET encryption key, which is used in the event that the RND encryption is subsequently adjusted to DET encryption (subsequent to the re-encryption). If the data column is already adjusted from RND encryption to DET encryption (i.e., the RND encryption layer has been removed and the data column is encrypted with DET encryption), the re-encryption revokes the current DET encryption key and establishes a new DET encryption key, while preserving the DET encryption. In some implementations, the re-encryption is unidirectional, such that the re-encryption—either RND or DET—cannot be reverted even though the cloud provider has performed the rekeying in the other direction. This unidirectionality is achieved by computing the re-encryption as a joint protocol between two, non-colluding service providers, as described in further detail herein.

In further detail, and in some implementations, an adjustable PRE scheme is provided as a tuple of multiple functions: a parameter generation function (ParamGen), a key generation function (KeyGen), an encryption function (Enc), a token function (Token), a re-encryption function (ReEnc), and an adjustment function (Adj), where $\lambda$ is the security parameter. In some examples, the ParamGen takes the security parameter $\lambda$ as input and outputs system parameters params. In some examples, the KeyGen function takes the security parameter $\lambda$ as input and outputs a secret key K. In some examples, the Enc function takes the system parameters params, the secret key K, and a message m (cleartext) as input, and provides a ciphertext C as output. In some examples, the Adj function takes the system parameters params, (part of) the secret key K, and a ciphertext C encrypted with a first encryption scheme (e.g., RND encryption) as input, and outputs a ciphertext C adjusted to a second encryption (e.g., DET encryption). In some examples, the Token function takes the system parameters params and secret keys K and K' as input, and outputs tokens $T_A$, $T_B$. In some examples, the ReEnc function takes the system parameters params, the ciphertext C, and the tokens $T_A$, $T_B$ as input, and outputs either a randomized or deterministic ciphertext C re-encrypted with secret key K', depending on the input ciphertext C (e.g., whether the input ciphertext C is encrypted with RND encryption or DET encryption). In some implementations, a state $\sigma$ indicates whether RND encryption or DET encryption is used. In some examples, $\sigma=\top$, if a RND encryption is used, and $\sigma=\bot$, if DET encryption is used.

In some examples, a chosen plaintext attack (IND-CPA) models a threat, in which an adversary eavesdrops on the conversation between a sender and a receiver. This captures the notion of the honest-but-curious cloud provider that has access to the outsourced database and learns the encrypted data, but does not manipulate either.

In view of this, an example security game between an adversary and a challenger for security parameter $\lambda$ can be considered. In the example security game, it is assumed that the adversary is able to break the encryption scheme, and the adversary is used as a solver to help solve a problem posed by the challenger. The problem relies on an assumption that is intended to be difficult to solve.

Setup: The challenger takes security parameter $\lambda$ and runs the ParamGen and the KeyGen algorithms. The challenger sends the system parameters params to the adversary and keeps the secret key K to itself.

Phase 1: The adversary generates messages $m \in \mathcal{M}$ and asks the challenger to encrypt the messages. The challenger runs the algorithm Enc and responds with C.

Challenge: The adversary generates messages $m_0$, $m_1$ and sends the messages to the challenger. The challenger chooses b∈{0,1} uniformly at random to select a message $m_b$, encrypts the message as $C_b$, and returns $C_b$ to the adversary.

Phase 2: The adversary generates further messages m∈$\mathcal{M}$ and asks the challenger to encrypt the messages.

Guess: The adversary outputs its guess b'∈{0,1} and wins the security game if and only if b=b'.

The advantage of the adversary in the security game is defined as:

$$\epsilon = Pr[b=b'] - \tfrac{1}{2}$$

A first definition (Definition 1: IND-CPA Security) provides that the Enc function, which takes the system parameters params, the secret key K, and a message m as input, and outputs a ciphertext C, is IND-CPA secure if:

$$Pr[\text{Adversary wins the security game for } \lambda] \le \tfrac{1}{2} + \text{negl}(\lambda)$$

In some examples, a known plaintext attack (KPA) models a threat, in which an adversary eavesdrops pairs of plaintexts and ciphertexts. For example, the cloud provider has access to the outsourced database and thereby learns the ciphertexts. Furthermore, the cloud provider observes all operations executed on the outsourced database. Although the cloud provider does not necessarily learn the plaintexts, it monitors the adjustment of a randomized to a deterministic ciphertext, for example.

In view of this, another example security game between an adversary (e.g., a TSP) and a challenger (e.g., client) for security parameter λ can be considered.

Setup: The challenger takes the security parameter λ and runs the ParamGen and the KeyGen functions. The challenger sends the system parameters params to the adversary and keeps the secret key K to itself.

Phase 1: The adversary issues a number of plaintexts $m_i$ to the challenger. The challenger returns the ciphertexts $C_i$ to the adversary.

Challenge: The adversary chooses two different plaintexts $m_0$, $m_1$, on which it wishes to be challenged with the constraint that they were not previously used in Phase 1. The challenger selects $m_b$ with b={0,1} uniformly at random and returns $C_b$ to the adversary.

Guess: The adversary outputs its guess b' for the encrypted plaintext and wins the security game if and only if b=b'.

The advantage of the adversary in the security game is defined as:

$$\epsilon = Pr[b=b'] - \tfrac{1}{2}.$$

A second definition (Definition 2: KPA Security) provides that the Adj function, which takes the system parameters params, a secret key K, and a randomized ciphertext C as input, and outputs a ciphertext C, is secure in the random-oracle-model against known plaintext attacks, if:

$$Pr[\text{Adversary wins the security game for } \lambda] \le \tfrac{1}{2} + \text{negl}(\lambda).$$

In some examples, the honest-but-curious cloud provider has access to the ciphertexts and also witnesses all operations executed on the database. In particular, this holds for the re-encryption of data. Furthermore, the cloud provider might learn keys revoked by the data owner. If the re-encryption scheme were reversible, the cloud provider could reverse the re-encryption. This facilitates the cloud provider with a ciphertext encrypted with a revoked key. If this key is known by the cloud provider, the cloud provider can gain access to the plaintext. To prevent this, implementations of the present disclosure provide security against reverse PRE.

Another example security game between an adversary and a challenger for security parameter λ can be considered.

Setup: The challenger takes security parameter λ, runs the ParamGen function, and returns the system parameters params to the adversary. The challenger runs the KeyGen function and generates two keys K, K'. The challenger sends K' to the adversary and keeps K to itself.

Phase 1: The adversary issues queries $q_1, \ldots, q_m$ where $q_i$ is one of the following:

Enc-Query: The adversary generates messages $m_i$ and asks for their encryption under key K'.

Token-Query: The adversary asks for a re-encryption token $T_A$ such that ciphertexts encrypted with key K' can be re-encrypted with key K.

Pre-Query: The adversary asks for the re-encryption of a previously encrypted ciphertext C' encrypted with key K' to be encrypted with key K.

Adj-Query: The adversary asks for the adjustment of a randomized ciphertext C encrypted under key K to a deterministic ciphertext.

Challenge: The adversary picks message m̂ on which it wishes to be challenged with the constraint that it was not previously used in Phase 1. The challenger encrypts message m̂ as ciphertext C with key K and asks the adversary for the re-encryption to ciphertext C' under key K'.

Phase 2: The adversary issues more queries $q_{m+1}, \ldots, q_n$ of the query types described above with the constraint that it does not include m̂.

Guess: The adversary outputs its guess C and wins the security game if and only if C=Ĉ.

The advantage of the adversary in the security game is defined as $$\epsilon = Pr[C=\hat{C}]$$

A third definition (Definition 3: Non-Reverse PRE) provides that the ReEnc function, which takes the system parameters params, the tokens $T_A$, $T_B$, and a ciphertext C as input, and outputs a ciphertext Ĉ, is secure against reverse PRE in the random oracle model if:

$$Pr[\text{Adversary wins the security game for } \lambda] \le \text{negl}(\lambda)$$

Implementations of the adjustable PRE scheme of the present disclosure are described in further detail below with reference to the Decisional Diffie-Hellman Problem (DDHP), with the assumption that the DDHP is difficult to solve, and the Diffie-Hellman Inversion Problem (DHIP), with the assumption that the DHIP is difficult to solve. The DDHP in a group $\mathbb{G}$ with order p is to distinguish whether c=ab or c∈$\mathbb{Z}_p$ uniformly chosen at random given $g^a$, $g^b$, $g^c$∈$\mathbb{G}$. The DHIP in $\mathbb{G}$ is the computation of $$g^{\frac{1}{a}} \text{ given } g^a.$$

In view of the foregoing, implementations of the adjustable PRE scheme of the present disclosure are described in further detail below. More particularly, each of the above-introduced functions will be described in further detail in view of the joint protocol to compute the re-encryption in accordance with the present disclosure.

Function 1 (ParamGen): params←ParamGen($1^\lambda$)—Generate a group $\mathbb{G}$ of order p and g∈$\mathbb{G}$. Define the message space as $\mathcal{M} = \{0,1\}^n$ and the ciphertext space as $\mathcal{C} = \mathbb{G} \times \mathbb{G}$, if the encryption is RND, and $\mathcal{C} = \mathbb{G}$, if the encryption is DET. Choose a keyed cryptographic hash function $H_k$: $\{0,1\}^n \to \mathbb{G}$ with k the key only known to the challenger. In the security analysis, $H_k$ is referred to as a random oracle. Output the system parameters params=$\{\mathbb{G}, \mathcal{C}, \mathcal{M}, g, p, H_k\}$.

Function 2 (KeyGen): K←KeyGen($1^\lambda$)—Choose $x \in \mathbb{Z}_p$ and $y \in \mathbb{Z}_p$ uniformly at random. Output K=<x, y>.

Function 3 (Enc): C←Enc(params, K, m)—Choose $r \in \mathbb{Z}_p$ uniformly at random. Compute $c=g^r$ and $d=H_k(m)^y g^{rx}$. Set a state $\sigma=T$ specifying that RND encryption is used. Output ciphertext C=<T, (c,d)>.

Function 4 (Adj): C=Adj (params, x, C)—Parse C. If $\sigma=\bot$, abort, otherwise C=<T,(c,d)>. Compute:

$$\tilde{c} = \frac{d}{c^x} = \frac{H_k(m)^y g^{rx}}{g^{rx}} = H_k(m)^y$$

and set $\sigma=\bot$ specifying that DET encryption is used. Output C=<$\bot$, $\tilde{c}$>.

Function 5 (Token): $\{T_A, T_B\}$=Token(params, K, K')—Compute:

$$x^* = x' - x = x_A + x_B \bmod p$$

and $$y^* = \frac{y'}{y} = y_A y_B \bmod p$$

Set $T_A=(x_A, y_A)$ and $T_B=(x_B, y_B)$. Output $T_A$, $T_B$ and distribute $T_A$ to Server A and $T_B$ to Server B.

Function 6 (ReEnc): C←ReEnc(params, C, $T_A$, $T_B$)—Parse C. If $\sigma=\bot$, then C=<$\bot$, $\tilde{c}$>. Compute:

$$c' = \tilde{c}^{y_A y_B} = \tilde{c}^{y^*} = \tilde{c}^{\frac{y'}{y}} = H_k(m)^{\frac{y y'}{y}} = H_k(m)^{y'}$$

and output C=<$\bot$, c'>. This is the re-encryption of a deterministic ciphertext as indicated by the state $\sigma=\bot$.

Figure 2:
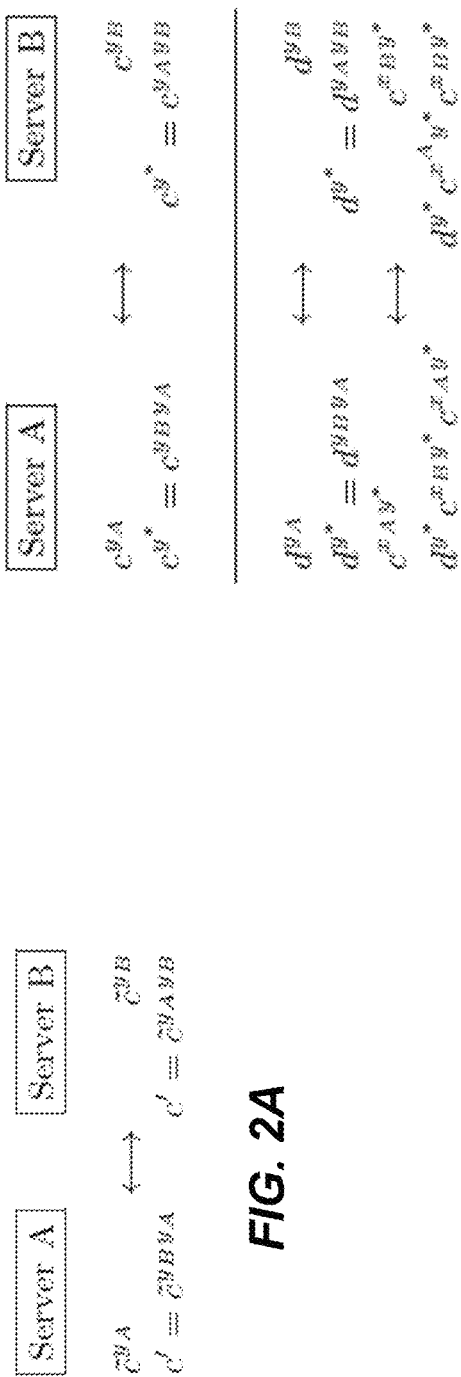
FIG. 2A depicts a proxy re-encryption scheme in accordance with implementations of the present disclosure for data encrypted using a first encryption scheme.
FIG. 2B depicts a proxy re-encryption scheme in accordance with implementations of the present disclosure for data encrypted using a second encryption scheme.

FIG. 2A depicts the joint protocol of two cloud providers (e.g., Server A (the server system 104a of FIG. 1) and Server B (the server system 104b of FIG. 1)) to execute the re-encryption of a deterministic ciphertext. That is, to compute c' given c=<$\bot$, $\tilde{c}$>. Server A and Server B are equipped with tokens $T_A$, $T_B$, respectively, and it is assumed that they do not collude. That is, Server A and Server B keep their respective tokens secret. To compute c', Server A and Server B compute $\tilde{c}^{y_A}$ and $\tilde{c}^{y_B}$, respectively. Server A and Server B exchange their computations and each computes $\tilde{c}^{y^*}=(\tilde{c}^{y_A})^{y_B}=(\tilde{c}^{y_B})^{y_A}$.

If $\sigma=T$ (i.e., RND encryption), then C=<T, (c, d)>. Compute:

$$c' = c^{y_A y_B} = c^{y^*} = g^{\frac{r y'}{y}} = g^{r'}$$

and compute:

$$d' = d^{y_A y_B} c^{x_A y_A y_B} c^{x_B y_A y_B} = d^{y^*} c^{x^* y^*}$$
$$= (H_k(m)^y g^{rx})^{\frac{y'}{y}} g^{\frac{r y' (x'-x)}{y}}$$
$$= H_k(m)^{y'} g^{\frac{rxy'}{y}} g^{\frac{r y'(x'-x)}{y}}$$
$$= H_k(m)^{y'} g^{\frac{rx'y'}{y}} = H_k(m)^{y'} g^{r'x'}$$

Output C=<T, (c', d')>.
This is the re-encryption of a randomized ciphertext as indicated by the state $\sigma=T$.

FIG. 2B depicts the joint protocol of Server A and Server B to execute the re-encryption of a randomized ciphertext. That is, to compute c' and d' given C=<T, (c, d)>. Server A and Server B are equipped with tokens $T_A$, $T_B$, respectively, and it is again assumed that they do not collude. To compute c', Server A and Server B compute $c^{y_A}$ and $c^{y_B}$, respectively, and exchange their computations. Server A and Server B both compute $c^{y^*}=(c^{y_A})^{y_B}=(c^{y_B})^{y_A}$. To compute d', Server A computes $d^{y_A}$ and $C^{x_A y_A}$ and Server B computes $d^{y_B}$ and $C^{x_B y_B}$. They exchange their computations and compute $d'=d^{y_A y_B} c^{x_A y_A y_B} c^{x_B y_A y_B}$.

In accordance with the present disclosure, implementations are IND-CPA secure. More particularly, if the DDHP assumption holds, the Enc function is IND-CPA secure (Theorem 1). In some examples, Theorem 1 can be proven using the above-described security game:

Proof: Assuming that an adversary can solve the described security game correctly, and a polynomial time algorithm can be provided, which can solve the DDHP. For each instance of the DDHP (p, g, $g^s$, $g^x$, R=$g^z$) with z=xs if h=0 or z chosen uniformly at random if h=1, the polynomial time algorithm uses the adversary to decide whether R=$g^{xs}$ or R=$g^z$.

Setup: Receive an instance of the DDHP is received as (p, g, $g^s$, $g^x$, R). Choose $y \in \mathbb{Z}_p$ uniformly at random. Send system parameters p, g to the adversary.

Phase 1: The adversary generates arbitrary messages $m \in \mathcal{M}$ and asks for their ciphertexts C. Choose $r \in \mathbb{Z}_p$ uniformly at random. Encrypt m as ciphertext C=<T, (c, d)> with $c=g^r$ and $d=H_k(m)^y g^{rx}$. Return C to the adversary.

Challenge: The adversary generates two messages $m_b$ with $b \in \{0,1\}$ and sends them to the challenger. The challenger chooses $b \in \{0,1\}$ uniformly at random and returns $C_b$=<T, (c, d)> with $c=g^s$ and $d=H_k(m)^y R$ to the adversary.

Phase 2: The adversary generates further messages $m \in \mathcal{M}$ and receives their ciphertexts C.

Guess: The adversary outputs its guess for message $m_b$ denoted as $b' \in \{0,1\}$. If b=b', then set h'=0. If b≠b', set h'=1.

The probability that the polynomial time algorithm solves the instance of the DDHP is:

$$Pr[h=h']=Pr[h=0]Pr[h=h'|h=0]+Pr[h=1]Pr[h=h'|h=1]=\tfrac{1}{2}Pr[h'=0|h=0]+\tfrac{1}{2}Pr[h'=1|h=1]=\tfrac{1}{2}Pr[b=b'|h=0]+\tfrac{1}{2}Pr[b\neq b'|h=1]$$

In the case where h=0, it is R=$g^{xs}$ for this instance of the DDHP. To solve this problem is identical to solve the security game. Therefore, the probability that b=b' given h'=0 is:

$$Pr[b=b'|h=0]=Pr[b=b']=\tfrac{1}{2}+\epsilon$$

In the case where h=1, it is R=$g^z$ for this instance of the DDHP. As $z \in \mathbb{Z}_p$ is uniformly chosen at random and independently of g, y, $m_0$, $m_1$, b, it is $H_k(m)R$ uniformly distributed in $\mathbb{G}$. The random variables g, $g^x$, $g^s$, T, b are also jointly independent. Therefore, the system parameters g, p and the ciphertext C=<T, (c, d)> do not reveal information about b. As b is either 0 or 1, it is:

$$Pr[b\neq b'|h=1]=\tfrac{1}{2}$$

Overall, the probability that the polynomial time algorithm solves the instance of the DDHP is:

$$Pr[h=h'] = \frac{1}{2}\left(\frac{1}{2}+\varepsilon\right) + \frac{1}{2} \cdot \frac{1}{2} = \frac{1}{2} + \frac{\varepsilon}{2}$$

The challenger solves the DDHP with advantage $$\frac{\varepsilon}{2}.$$

If the DDHP assumption holds, this advantage can only be negligible. So, $$\frac{\varepsilon}{2}$$

and, thus also $\varepsilon$ are negligible. Therefore, the adversary can only solve the distinguishability under chosen-plaintext attack only with a negligible advantage.

In accordance with the present disclosure, implementations are IND-KPA secure. More particularly, if the DDHP assumption holds, the Adj function is secure against known plaintext attacks in a random-oracle-model (Theorem 2). In some examples, Theorem 2 can be proven using the above-described example security game:

Proof: Assuming that an adversary can solve the described security game correctly, a polynomial time algorithm can be provided, which can solve the DDHP. For each instance of the DDHP (p, g, $g^s$, $g^y$, R=$g^z$) with z=sy if h=0 or z chosen uniformly at random if h=1, the polynomial time algorithm uses the adversary to decide whether R=$g^{sy}$ or R=$g^z$.

Setup: Receive an instance of the DDHP (p, g, $g^s$, $g^y$, R=$g^z$). Send parameters g, p to the adversary.

Phase 1: The adversary issues a number of plaintexts m∈$\mathcal{M}$ to the challenger.

H-Queries: The challenger queries the random oracle. The random oracle maintains a list of triples <m, $g^t$, t> with m∈$\mathcal{M}$ the queried plaintext, $g^t$∈$\mathbb{G}$, and t∈$\mathbb{Z}_p$ chosen uniformly at random. If this list contains plaintext m, the random oracle returns $g^t$ as $H_k$(m). If m is not included in the list, the random oracle picks t uniformly at random, computes $g^t$, and adds the triple to the list. The list is accessible to the challenger.

Phase 2: The challenger computes $\tilde{c}=H_k(m)^y=(g^y)^t$ and returns C=<⊥, $\tilde{c}$> to the adversary.

Challenge: The adversary chooses two different plaintexts $m_0$, $m_1$, on which it wishes to be challenged with the constraint that they were not previously used in Phase 1. The challenger picks $m_b$ with b={0,1} uniformly at random and issues $m_b$ to the random oracle. The random oracle includes <$m_b$, $g^s$, Ø> in the list. The challenger returns C=<⊥, $\tilde{c}$> with $\tilde{c}$=R to the adversary.

Guess: The adversary outputs its guess for the encrypted plaintext denoted as b'∈{0,1}. If b=b', then set h'=0. If b≠b', set h'=1.

The probability that the polynomial time algorithm solves the instance of the DDHP is:

$Pr[h=h']=½Pr[b=b'|h=0]+½Pr[b≠b'|h=1]$

In the case where h=0, it is R=$g^{sy}$ for this instance of the DDHP. To solve this problem is identical to solve the defined security game. Therefore, the probability that b=b' given h'=0 is:

$Pr[b=b'|h=0]=Pr[b=b']=½+\varepsilon$

In the case where h=1, it is R=$g^z$ for this instance of the DDHP. Because z∈$\mathbb{Z}_p$ is chosen uniformly at random and independently of g, s, y, $m_0$, $m_1$, b, it is $g^z$ uniformly distributed in $\mathbb{G}$. The random variables g, $g^y$, $g^t$, b are also jointly independent. Therefore, the system parameters g, p and the ciphertext C=<⊥, $\tilde{c}$> do not reveal information about b. As b is either 0 or 1, it is:

$Pr[b≠b'|h=1]=½$

Overall, the probability that the polynomial time algorithm solves the instance of the DDHP is:

$$Pr[h=h']=\frac{1}{2}\left(\frac{1}{2}+\varepsilon\right)+\frac{1}{2}\cdot\frac{1}{2}=\frac{1}{2}+\frac{\varepsilon}{2}$$

The polynomial time algorithm solves the DDHP with advantage $$\frac{\varepsilon}{2}.$$

If the DDHP assumption holds, this advantage can only be negligible. Consequently, $$\frac{\varepsilon}{2}$$

and, thus also $\varepsilon$ are negligible. Therefore, the adversary can only solve the distinguishability under known-plaintext attack with a negligible advantage.

In accordance with the present disclosure, implementations are unidirectional (i.e., non-reversible PRE is provided). More particularly, if the DHIP assumption holds, the PRE scheme of the present disclosure is unidirectional in a random-oracle-model (Theorem 3). In some examples, Theorem 3 can be proven using the above-described example security game:

Proof: Assuming that an adversary can solve the described security game correctly, a polynomial time algorithm can be provided, which can solve the DHIP. For each instance of the DHIP (p, g, $g^a$), the polynomial time algorithm uses the adversary to compute $$g^{\frac{1}{a}}.$$

Setup: Receive an instance of the DHIP as (p, g, $g^a$). Choose x, x', y'∈$\mathbb{Z}_p$ uniformly at random. Send system parameters p, g and key K'=<x', y'> to the adversary. The challenger keeps key K=<x, •> to itself.

Phase 1: The adversary submits the described queries to the challenger. That is, the adversary issues queries $q_1, \ldots, q_m$ where $q_i$ is one of the following:

Enc-Query: The adversary generates messages m∈$\mathcal{M}$ and asks for their encryption under key K'. The challenger queries the random oracle. The random oracle maintains a list of triples <m, $g^t$, t> with m∈$\mathcal{M}$ the queried plaintext, $g^t$∈$\mathbb{G}$ and t∈$\mathbb{Z}_p$ chosen uniformly at random. If this list contains plaintext m, the random oracle returns $g^t$ as $H_k$(m). If m is not included in the list, the random oracle picks t∈$\mathbb{Z}_p$ uniformly at random, computes $g^t$ and adds the triple to the list. Again, the list is accessible for the challenger. The challenger encrypts plaintext m with key K'=<x', y'> as:

$c'=g^r$ and $d'=H_k(m)^{y'}g^{rx'}$ with $r' \in \mathbb{Z}_p$ chosen uniformly at random. The challenger maintains a list of triples <c', r', t> and adds the triple for this ciphertext to the list.

Pre-Query: The adversary can ask for the re-encryption to key K of a previously encrypted randomized ciphertext C'=<T, (c', d')> under K'. The challenger looks up c' in its list and retrieves the triple <c', r', t>. The re-encryption C=<T, (c, d)> under key K is:

$$c = g^{a\frac{r'}{y'}} = c'^{\frac{a}{y'}}$$

$$d = g^{at}g^{a\frac{r'x}{y'}}$$

Token-Query: The adversary asks for token $T_A$ simulating one cloud provider. The token $T_A = \langle x_A, y_A \rangle$ is used in the joint protocol to re-encrypt ciphertexts encrypted with key K'. Choose $x_A \in \mathbb{Z}_p$ and $y_A \in \mathbb{Z}_p$ uniformly at random (set $y_B = y - y' - y_A$). Return $T_A = \langle x_A, y_A \rangle$. Note that the challenger can simulate the view of the adversary in a re-encryption protocol. It can compute the inverse operation of the protocol messages using the resulting ciphertext C of the re-encryption query and the tokens. Hence the adversary's view in a re-encryption protocol is computationally indistinguishable from the messages in this security game.

Adj-Query: The adversary asks for the adjustment of a randomized ciphertext C to a deterministic ciphertext. The adjustment can be executed for ciphertexts encrypted with key K. A randomized ciphertext C is adjusted to a deterministic ciphertext as:

$$\tilde{c} = \frac{d}{c^x} = \frac{g^{at}g^{a\frac{rx}{y'}}}{g^{a\frac{rx}{y'}}} = g^{at}$$

Challenge: The adversary picks a plaintext $\hat{m} \in \mathcal{M}$, on which it wishes to be challenged with the constraint that the plaintext was not previously used in Phase 1, and sends it to the challenger. The challenger queries the random oracle. Given the constraint, $\hat{m}$ is not included in the list maintained by the random oracle and the random oracle adds an entry <$\hat{m}$, Ø, Ø> to the list. The challenger chooses r, $s \in \mathbb{Z}_p$ uniformly at random and computes $\hat{C}$=<T, ($\hat{c}$, $\hat{d}$)> as:

$$\hat{c}=g^r \text{ and } \hat{d}=g^s g^{rx}=g^s g^{rx}$$

and asks the adversary to re-encrypt the ciphertext C encrypted with key K=<x, •> to ciphertext $\hat{C}'$ encrypted with key K'=<x', y'>.

Phase 2: The adversary submits further queries to the challenger.

Guess: The adversary returns its guess $\hat{C}'$=<T, ($\hat{c}'$, $\hat{d}'$)> for the re-encrypted challenge ciphertext. If it is a correct guess, then:

$$\hat{c}' = g^{\frac{r'y'}{a}} \text{ and } \hat{d}' = g^{\frac{sy'}{a}} g^{\frac{rx'y'}{a}}$$

The challenger computes:

$$\left(\frac{\hat{d}'}{\hat{c}'^{x'}}\right)^{\frac{1}{sy'}} = \left(\frac{g^{\frac{sy'}{a}} g^{\frac{rx'y'}{a}}}{g^{\frac{rx'y'}{a}}}\right)^{\frac{1}{sy'}} = g^{\frac{1}{a}}$$

The probability that the polynomial time algorithm solves the DHIP is the same as the advantage of the adversary in the security game, which is:

$$Pr[C=\hat{C}]=\epsilon$$

If the DHIP assumption holds, this advantage can only be negligible. Therefore, the adversary can only achieve the reverse proxy re-encryption attack with a negligible advantage.

Figure 3:
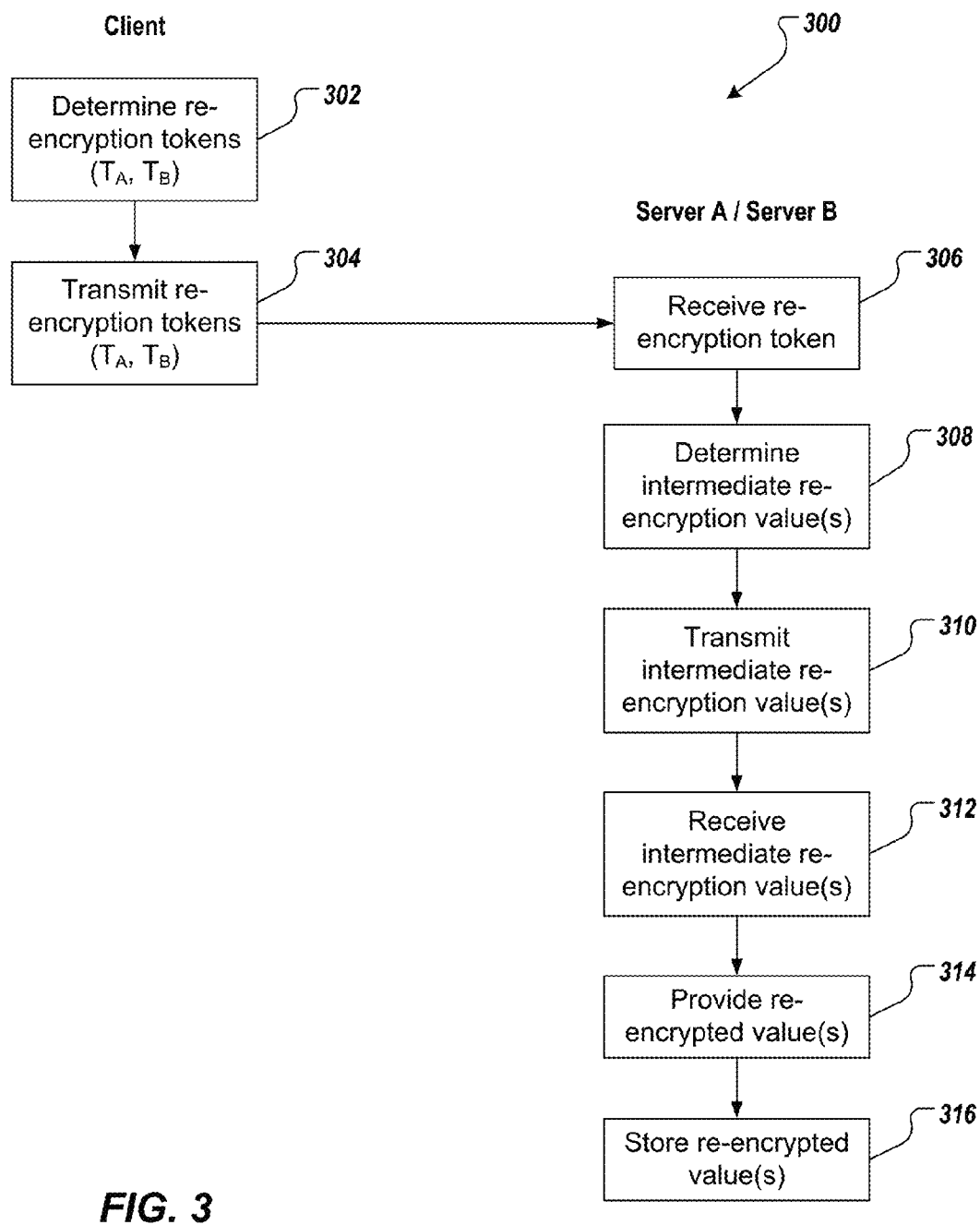
FIG. 3 depicts an example process that can be executed in accordance with implementations of the present disclosure.

FIG. 3 depicts an example process 300 that can be executed in accordance with implementations of the present disclosure. In some examples, the example process 300 can be provided as one or more computer-executable programs executed using one or more computing devices. In some implementations, the example process 300 is executed for proxy re-encryption of encrypted data stored in a first database of a first server (e.g., Server A) and a second database of a second server (e.g., Server B).

Re-encryption tokens ($T_A$, $T_B$) are determined (302). For example, the client determines the re-encryption tokens ($T_A$, $T_B$) based on params, the current encryption key K, and the new encryption key K' by executing the Token function, described above. The re-encryption tokens are transmitted (304). For example, the client transmits $T_A$ to Server A and transmits $T_B$ to Server B.

A re-encryption token is received (306). For example, Server A receives $T_A$ and Server B receives $T_B$. On or more intermediate re-encryption values are determined (308). For example, and with reference to Server A, an intermediate re-encrypted value $\hat{c}^{y_A}$ is determined based on $T_A$, if the encrypted data that is to be re-encrypted is encrypted with DET encryption; or intermediate re-encrypted values $c^{y_A}$, $d^{y_A}$ and $c^{x_A y_A}$ are determined based on $T_A$, if the encrypted data that is to be re-encrypted is encrypted with RND encryption. As another example, and with reference to Server B, an intermediate re-encrypted value $\hat{c}^{y_B}$ is determined based on $T_B$, if the encrypted data that is to be re-encrypted is encrypted with DET encryption; or intermediate re-encrypted values $c^{y_B}$, $d^{y_B}$ and $c^{x_B y_B}$ are determined based on $T_B$, if the encrypted data that is to be re-encrypted is encrypted with RND encryption. The one or more intermediate re-encryption values are transmitted (310). For example, Server A transmits the intermediate re-encrypted value $\hat{c}^{y_A}$, if the encrypted data that is to be re-encrypted is encrypted with DET encryption, to Server B; or transmits the intermediate re-encrypted values $c^{y_A}$, $d^{y_A}$ and $c^{x_A y_A}$ to Server B, if the encrypted data that is to be re-encrypted is encrypted with RND encryption. As another example, Server B transmits the intermediate re-encrypted value $\hat{c}^{y_B}$ to Server A, if the encrypted data that is to be re-encrypted is encrypted with DET encryption; or transmits the intermediate re-encrypted values $c^{y_B}$, $d^{y_B}$ and $c^{x_B y_B}$ to Server A, if the encrypted data that is to be re-encrypted is encrypted with RND encryption.

The one or more intermediate re-encryption values are received (312). For example, Server A receives the one or more intermediate encryption values sent from Server B, and Server B receives the one or more intermediate encryption values sent from Server A. One or more re-encrypted values are provided (314). For example, Server A provides the re-encrypted value c' based on the one or more intermediate re-encryption values, if the encrypted data that is to be re-encrypted is encrypted with DET encryption; or Server A provides the re-encrypted values c', d' based on the one or more intermediate re-encryption values, if the encrypted data that is to be re-encrypted is encrypted with RND encryption. As another example, Server B provides the re-encrypted value c' based on the one or more intermediate re-encryption values, if the encrypted data that is to be re-encrypted is encrypted with DET encryption; or Server B provides the re-encrypted values c', d' based on the one or more intermediate re-encryption values, if the encrypted data that is to be re-encrypted is encrypted with RND encryption.

The one or more re-encrypted values are stored (316). For example, Server A stores the re-encrypted value c' in the first database, if the encrypted data that is to be re-encrypted is encrypted with DET encryption; or Server A stores the re-encrypted values c', d' in the first database, if the encrypted data that is to be re-encrypted is encrypted with RND encryption. As another example, Server B stores the re-encrypted value c' in the second database, if the encrypted data that is to be re-encrypted is encrypted with DET encryption; or Server B stores the re-encrypted values c', d' in the second database, if the encrypted data that is to be re-encrypted is encrypted with RND encryption.

Figure 4:
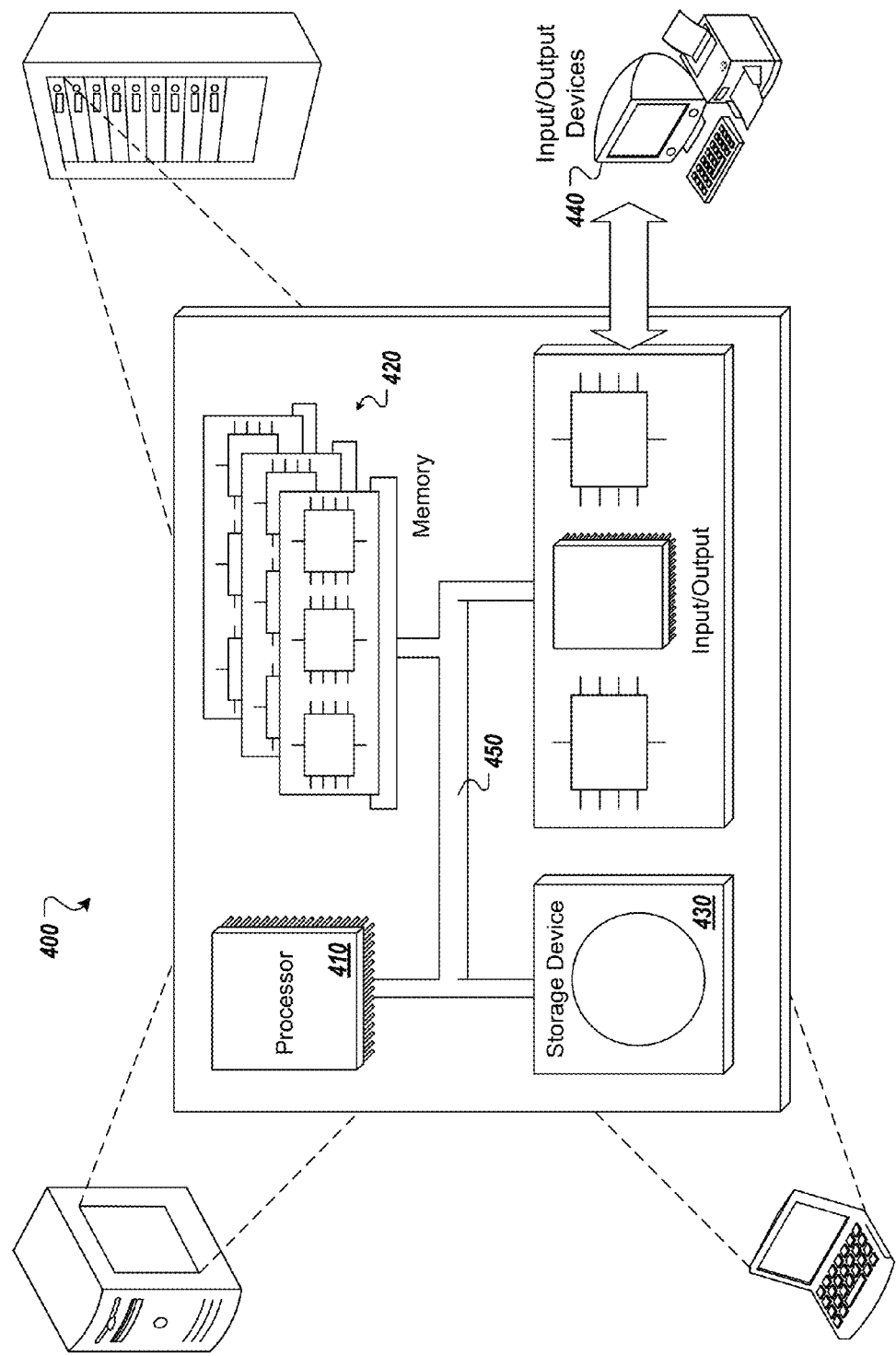
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. The components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the FIGS. do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for proxy re-encryption of encrypted data stored in a first database of a first server and a second database of a second server, the method being executed using one or more processors and comprising:

receiving, by the one or more processors, a first token at the first server from a client-side computing device;

determining, by the one or more processors, a first intermediate re-encrypted value based on a first encrypted value and the first token, the first encrypted value being encrypted with a current encryption key, the first token and the current encryption key being each provided by the client-side computing device to the first server and the first token being determined based on the current encryption key that the encrypted value was encrypted with, and a new encryption key configured to revoke the current encryption key;

transmitting, by the one or more processors, the first intermediate re-encrypted value to the second server;

receiving, by the one or more processors, a second intermediate re-encrypted value at the first server from the second server, the second intermediate re-encrypted value having been provided by encrypting the first encrypted value at the second server based on a second token, the second token being different than the first token, the second token being provided by the client-side computing device to the second server and the second token being determined based on the current encryption key and the new encryption key;

determining, by the one or more processors and at the first server, the first encrypted value as a first re-encrypted value based on the first intermediate re-encrypted value and the second intermediate re-encrypted value, such that the first re-encrypted value is encrypted with the new encryption key that revokes the current encryption key; and storing, by the one or more processors, the first re-encrypted value in the first database.

2. The method of claim 1, wherein the first encrypted value and the first re-encrypted value are encrypted using deterministic encryption.

3. The method of claim 1, further comprising:

providing, by the one or more processors, a third intermediate re-encrypted value and a fourth intermediate re-encrypted value based on a second encrypted value and the first token;

transmitting, by the one or more processors, the third intermediate re-encrypted value and the fourth intermediate re-encrypted value to the second server;

receiving, by the one or more processors, a fifth intermediate re-encrypted value and a sixth intermediate re-encrypted value from the second server, the fifth intermediate re-encrypted value and the sixth intermediate re-encrypted value having been provided at the second server based on a second token;

providing, by the one or more processors, the second encrypted value as a second re-encrypted value based on the third intermediate re-encrypted value, the fourth intermediate re-encrypted value, the fifth intermediate re-encrypted value and the sixth intermediate re-encrypted value; and storing, by the one or more processors, the second re-encrypted value in the first database.

4. The method of claim 3, wherein the second encrypted value and the second re-encrypted value are encrypted using randomized encryption.

5. The method of claim 1, wherein the first database and the second database store the same encrypted data.

6. The method of claim 1, wherein the first re-encrypted value is also provided by the second server and is stored in the second database.

7. A non-transitory computer-readable storage medium coupled to one or more processors and having instructions stored thereon which, when executed by the one or more processors, cause the one or more processors to perform operations for proxy re-encryption of encrypted data stored in a first database of a first server and a second database of a second server, the operations comprising:

receiving a first token at the first server from a client-side computing device;

determining a first intermediate re-encrypted value based on a first encrypted value and the first token, the first encrypted value being encrypted with a current encryption key, the first token and the current encryption key being each provided by the client-side computing device to the first server and the first token being determined based on the current encryption key that the encrypted value was encrypted with, and a new encryption key configured to revoke the current encryption key;

transmitting the first intermediate re-encrypted value to the second server;

receiving a second intermediate re-encrypted value at the first server from the second server, the second intermediate re-encrypted value having been provided by encrypting the first encrypted value at the second server based on a second token, the second token being different than the first token, the second token being provided by the client-side computing device to the second server and the second token being determined based on the current encryption key and the new encryption key;

determining, at the first server, the first encrypted value as a first re-encrypted value based on the first intermediate re-encrypted value and the second intermediate re-encrypted value, such that the first re-encrypted value is encrypted with the new encryption key that revokes the current encryption key; and storing the first re-encrypted value in the first database.

8. The computer-readable storage medium of claim 7, wherein the first encrypted value and the first re-encrypted value are encrypted using deterministic encryption.

9. The computer-readable storage medium of claim 7, wherein operations further comprise:

providing a third intermediate re-encrypted value and a fourth intermediate re-encrypted value based on a second encrypted value and the first token;

transmitting the third intermediate re-encrypted value and the fourth intermediate re-encrypted value to the second server;

receiving a fifth intermediate re-encrypted value and a sixth intermediate re-encrypted value from the second server, the fifth intermediate re-encrypted value and the sixth intermediate re-encrypted value having been provided at the second server based on a second token;

providing the second encrypted value as a second re-encrypted value based on the third intermediate re-encrypted value, the fourth intermediate re-encrypted value, the fifth intermediate re-encrypted value and the sixth intermediate re-encrypted value; and storing the second re-encrypted value in the first database.

10. The computer-readable storage medium of claim 9, wherein the second encrypted value and the second re-encrypted value are encrypted using randomized encryption.

11. The computer-readable storage medium of claim 7, wherein the first database and the second database store the same encrypted data.

12. The computer-readable storage medium of claim 7, wherein the first re-encrypted value is also provided by the second server and is stored in the second database.

13. A system, comprising:
   a computing device; and
   a computer-readable storage device coupled to the computing device and having instructions stored thereon which, when executed by the computing device, cause the computing device to perform operations for proxy re-encryption of encrypted data stored in a first database of a first server and a second database of a second server, the operations comprising:
      receiving a first token at the first server from a client-side computing device;
      determining a first intermediate re-encrypted value based on a first encrypted value and the first token, the first encrypted value being encrypted with a current encryption key, the first token and the current encryption key being each provided by the client-side computing device to the first server and the first token being determined based on the current encryption key that the encrypted value was encrypted with, and a new encryption key configured to revoke the current encryption key;
      transmitting the first intermediate re-encrypted value to the second server;
      receiving a second intermediate re-encrypted value at the first server from the second server, the second intermediate re-encrypted value having been provided by encrypting the first encrypted value at the second server based on a second token, the second token being different than the first token, the second token being provided by the client-side computing device to the second server and the second token being determined based on the current encryption key and the new encryption key;
      determining at the first server, the first encrypted value as a first re-encrypted value based on the first intermediate re-encrypted value and the second intermediate re-encrypted value, such that the first re-encrypted value is encrypted with the new encryption key that revokes the current encryption key; and
      storing the first re-encrypted value in the first database.

14. The system of claim 13, wherein the first encrypted value and the first re-encrypted value are encrypted using deterministic encryption.

15. The system of claim 13, wherein operations further comprise:
   providing a third intermediate re-encrypted value and a fourth intermediate re-encrypted value based on a second encrypted value and the first token;
   transmitting the third intermediate re-encrypted value and the fourth intermediate re-encrypted value to the second server;
   receiving a fifth intermediate re-encrypted value and a sixth intermediate re-encrypted value from the second server, the fifth intermediate re-encrypted value and the sixth intermediate re-encrypted value having been provided at the second server based on a second token;
   providing the second encrypted value as a second re-encrypted value based on the third intermediate re-encrypted value, the fourth intermediate re-encrypted value, the fifth intermediate re-encrypted value and the sixth intermediate re-encrypted value; and
   storing the second re-encrypted value in the first database.

16. The system of claim 15, wherein the second encrypted value and the second re-encrypted value are encrypted using randomized encryption.

17. The system of claim 13, wherein the first database and the second database store the same encrypted data.

* * * * *